US011208072B2

(12) United States Patent
Yamamoto et al.

(10) Patent No.: US 11,208,072 B2
(45) Date of Patent: Dec. 28, 2021

(54) EJECTOR AND GAS GENERATOR

(71) Applicant: DAICEL CORPORATION, Osaka (JP)

(72) Inventors: Koji Yamamoto, Tokyo (JP); Mikio Yabuta, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 114 days.

(21) Appl. No.: 16/628,248

(22) PCT Filed: Jul. 9, 2018

(86) PCT No.: PCT/JP2018/025935
§ 371 (c)(1),
(2) Date: Jan. 2, 2020

(87) PCT Pub. No.: WO2019/013180
PCT Pub. Date: Jan. 17, 2019

(65) Prior Publication Data
US 2020/0216011 A1    Jul. 9, 2020

(30) Foreign Application Priority Data

Jul. 14, 2017  (JP) .............................. JP2017-138143

(51) Int. Cl.
*B60R 21/264* (2006.01)
*B60R 21/26* (2011.01)
(Continued)

(52) U.S. Cl.
CPC ............ *B60R 21/2644* (2013.01); *F42B 3/04* (2013.01); *B60R 2021/26011* (2013.01); *B60R 2021/26029* (2013.01); *B60R 2021/2648* (2013.01)

(58) Field of Classification Search
CPC ... B60R 21/26; B60R 21/264; B60R 21/2644; B60R 2021/26011; B60R 2021/26029; B60R 2021/2648
See application file for complete search history.

(56) References Cited

U.S. PATENT DOCUMENTS

RE18,837 E  *  5/1933  Rolland .................... F42B 3/11
                                                     102/202.11
4,068,862 A  *  1/1978  Ishi ......................... B60R 21/26
                                                     102/531
(Continued)

FOREIGN PATENT DOCUMENTS

JP    2009-286218 A    12/2009
WO   WO 02/051673 A1   7/2002

OTHER PUBLICATIONS

International Preliminary Report on Patentability and Written Opinion of the International Searching Authority, dated Jan. 23, 2020, for International Application No. PCT/JP2018/025935, with an English translation.

(Continued)

*Primary Examiner* — Barry Gooden, Jr.
(74) *Attorney, Agent, or Firm* — Birch, Stewart, Kolasch & Birch, LLP

(57) ABSTRACT

An ejector for ejecting a combustion product including, an igniter including an ignition charge and an ignition portion, a pyrotechnic agent, and a cup made of metal, the cup including a bottom surface and a peripheral wall, the peripheral wall being contiguous with a peripheral edge of the bottom surface and disposed to surround the ignition portion, the cup further including an accommodating space accommodating therein the pyrotechnic agent, the bottom surface of the cup including a through hole being defined by a plurality of through-hole peripheral edges, and the adjacent through-hole peripheral edges being connected together at a (Continued)

predetermined connection point, and the through hole including a narrow part, in which a width of the through hole defined by each of parts of the two through-hole peripheral edges of the plurality of through-hole peripheral edges decreases gradually with an increasing distance from a center of the bottom surface toward the peripheral edge of the bottom surface, and the narrow part being located closer to the peripheral edge of the bottom surface than a non-narrow part, which is defined by each of other parts of the two through-hole peripheral edges, is located.

17 Claims, 14 Drawing Sheets

(51) Int. Cl.
  *B60R 21/263* (2011.01)
  *F42B 3/04* (2006.01)

(56) References Cited

U.S. PATENT DOCUMENTS

| | | | | |
|---|---|---|---|---|
| 4,943,086 A * | 7/1990 | Cunningham | ............. | B01J 7/00 280/741 |
| 5,470,104 A | 11/1995 | Smith et al. | | |
| 5,494,312 A | 2/1996 | Rink | | |
| 5,531,473 A | 7/1996 | Rink et al. | | |
| 5,533,752 A * | 7/1996 | Brown | ............. | B60R 21/21 137/67 |
| 5,603,525 A * | 2/1997 | Zakula | ............. | B60R 21/268 102/202.14 |
| 5,803,492 A | 9/1998 | Rink et al. | | |
| 5,836,610 A | 11/1998 | Rink et al. | | |
| 6,012,737 A * | 1/2000 | Van Wynsberghe | ............. | B60R 21/2644 280/737 |
| 6,062,599 A * | 5/2000 | Forbes | ............. | F16K 13/06 280/737 |
| 6,412,811 B1 * | 7/2002 | Campbell | ............. | B60R 21/268 137/68.13 |
| 6,823,796 B1 * | 11/2004 | Amano | ............. | B60R 22/4628 102/202.14 |
| 6,830,264 B2 * | 12/2004 | Al-Amin | ............. | B60R 21/268 102/531 |
| 6,908,106 B2 * | 6/2005 | Campbell | ............. | B60R 21/268 280/741 |
| 7,516,701 B2 * | 4/2009 | Kurita | ............. | B60R 21/26 102/530 |
| 7,658,406 B2 * | 2/2010 | Townsend | ............. | B60R 21/264 280/737 |
| 7,845,278 B2 * | 12/2010 | Brisighella, Jr. | ............. | B60R 21/26 102/202.5 |
| 8,434,413 B2 * | 5/2013 | Mitsunabe | ............. | F42B 3/103 102/530 |
| 8,651,520 B2 * | 2/2014 | Jung | ............. | B60R 21/274 280/737 |
| 9,079,808 B2 * | 7/2015 | Matsuura | ............. | F42B 3/195 |
| 10,760,880 B2 * | 9/2020 | Boutin | ............. | F42B 3/04 |
| 10,953,843 B2 * | 3/2021 | Ukita | ............. | B60R 21/274 |
| 2002/0079680 A1 * | 6/2002 | Moquin | ............. | C06D 5/06 280/736 |
| 2002/0145274 A1 * | 10/2002 | Magoteaux | ............. | B60R 21/276 280/740 |
| 2003/0042720 A1 | 3/2003 | Dolling et al. | | |
| 2004/0061319 A1 | 4/2004 | Saso et al. | | |
| 2005/0189753 A1 * | 9/2005 | Kato | ............. | F42B 3/04 280/741 |
| 2006/0150855 A1 * | 7/2006 | Maruyama | ............. | F42B 3/103 102/202.14 |
| 2006/0162607 A1 * | 7/2006 | Kodama | ............. | F42B 3/12 102/530 |
| 2006/0267322 A1 * | 11/2006 | Eckelberg | ............. | B60R 21/26 280/736 |
| 2007/0063495 A1 * | 3/2007 | Saito | ............. | B60R 21/2644 280/736 |
| 2007/0075536 A1 * | 4/2007 | Kelley | ............. | B60R 21/276 280/737 |
| 2007/0085314 A1 * | 4/2007 | Matsuda | ............. | B60R 21/261 280/740 |
| 2007/0095236 A1 * | 5/2007 | Maruyama | ............. | F42B 3/103 102/202.9 |
| 2007/0257476 A1 * | 11/2007 | Green, Jr. | ............. | B60R 21/268 280/737 |
| 2007/0257477 A1 * | 11/2007 | Ohji | ............. | B60R 21/264 280/741 |
| 2007/0261582 A1 * | 11/2007 | Lahitte | ............. | F42B 3/127 102/202.5 |
| 2009/0020990 A1 * | 1/2009 | Townsend | ............. | B60R 21/264 280/737 |
| 2009/0115175 A1 * | 5/2009 | Nishimura | ............. | B60R 21/2644 280/741 |
| 2009/0179408 A1 * | 7/2009 | Brisighella, Jr. | ............. | B60R 21/26 280/741 |
| 2010/0071580 A1 * | 3/2010 | Nakayasu | ............. | B60R 21/261 102/530 |
| 2011/0241324 A1 * | 10/2011 | Nakayasu | ............. | F42B 3/04 280/736 |
| 2012/0247361 A1 * | 10/2012 | Kobayashi | ............. | B60R 21/2644 102/530 |
| 2013/0199400 A1 * | 8/2013 | Matsuura | ............. | F42B 3/195 102/530 |
| 2014/0290523 A1 * | 10/2014 | Yano | ............. | B60R 21/264 102/530 |
| 2014/0311375 A1 * | 10/2014 | Divo | ............. | B29C 45/14598 102/530 |
| 2015/0158455 A1 * | 6/2015 | Ruckdeschel | ............. | C06D 5/00 280/741 |
| 2016/0167617 A1 * | 6/2016 | Wang | ............. | B60R 21/272 701/45 |
| 2018/0043854 A1 * | 2/2018 | Kobayashi | ............. | B60R 21/261 |
| 2018/0304848 A1 * | 10/2018 | Imai | ............. | B60R 21/2644 |
| 2019/0126886 A1 * | 5/2019 | Ukita | ............. | B60R 21/26 |
| 2019/0383589 A1 * | 12/2019 | Boutin | ............. | B60R 21/264 |
| 2020/0148159 A1 * | 5/2020 | Ebner | ............. | B60R 21/272 |

OTHER PUBLICATIONS

International Search Report, dated Sep. 4, 2018, for International Application No. PCT/JP2018/025935, with an English translation.

* cited by examiner

EJECTOR AND GAS GENERATOR

FIELD

The present invention relates to an ejector for ejecting a combustion product to the outside, and also relates to a gas generator that includes the ejector and generates combustion gas by burning a gas generating agent.

BACKGROUND

Apparatuses configured to burn a pyrotechnic agent, such as gunpowder and a gas generating agent, to eject a resulting combustion product are widely used to utilize the combustion product as a power source for achieving a desired operation. Such an ejector can be utilized, for example, as a drive source for deploying an airbag of an airbag device installed in a vehicle or the like. In such a combustion-product ejector, the combustion product of a pyrotechnic agent generated inside the ejector needs to be accurately ejected in a direction necessary for an intended operation.

For example, a technology described in Patent Document 1 discloses an aspect in which a combustion product is ejected laterally from an ejector. Specifically, the ejector includes a housing covering an igniter configured to burn an ignition charge. Furthermore, on the side of the housing, a plurality of linear scores extending in the longitudinal direction of the ejector are formed at equal intervals in the circumferential direction of the housing. The scores are thinner than other parts of the housing. Thus, when the igniter in the housing is actuated and a combustion product is generated, then internal pressure of the housing increases, whereby the score cleaves in a direction of extension thereof, and, as a result, the combustion product is ejected laterally from the ejector through an opening formed by the cleaving.

CITATION LIST

Patent Document

[Patent Document 1] U.S. Pat. No. 5,803,492

SUMMARY

Technical Problem

An ejector in the related art is intended to eject a combustion product radially and laterally from the ejector by using scores formed as thinned parts. When such fragile parts having lower strength are partially provided to cleave the fragile parts by the pressure generated at a time of combustion of a pyrotechnic agent, the fragile parts have to be formed to have strength that allows for desired cleaving. For example, when it is intended to eject a combustion product radially, as in the related art, all of the scores formed as thinned parts have to have the same thickness. When there is variation in the thickness among the scores, the thinnest score cleaves first, and in some cases, some scores cannot cleave sufficiently, and as a result, the combustion product is not ejected in a desired direction.

In light of the problems described above, an object of the present invention is to provide an ejector that can suitably eject, laterally from the ejector, a combustion product of a pyrotechnic agent in a desired direction.

Solution to Problem

To solve the above problem, in the present invention, a shape of a through hole provided at the top of a component forming an outer shell of an ejector is devised, and a configuration in which stress is concentrated at a predetermined part in a peripheral edge of the through hole due to burning of an ignition charge on the inside, is employed. With that configuration, in the outer shell component, it is possible to form cleavage that extends from where the stress is concentrated to the side of the outer shell component, and eject the combustion product laterally from the outer shell.

Specifically, an ejector according to an embodiment of the present invention is an ejector for ejecting a combustion product, and the ejector includes an igniter including an ignition charge and an ignition portion configured to burn the ignition charge, a pyrotechnic agent disposed to be burned by combustion of the ignition charge, and a cup made of metal, the cup including a bottom surface and a peripheral wall. The bottom surface of the cup is disposed opposite the ignition portion, the peripheral wall of the cup is contiguous with a peripheral edge of the bottom surface and disposed to surround the ignition portion, and the cup further including an accommodating space formed by the peripheral wall and the bottom surface and accommodating therein the pyrotechnic agent. In addition, the bottom surface of the cup includes a through hole through which the accommodating space and an outside of the cup communicate with each other, the through hole is defined by a plurality of through-hole peripheral edges, and the adjacent through-hole peripheral edges are connected together at a predetermined connection point. Furthermore, the through hole includes a narrow part, in which a width of the through hole defined by each of parts of the two through-hole peripheral edges of the plurality of through-hole peripheral edges decreases gradually with an increasing distance from a center of the bottom surface toward the peripheral edge of the bottom surface, and the narrow part is located closer to the peripheral edge of the bottom surface than a non-narrow part, which is defined by each of other parts of the two through-hole peripheral edges, is located.

The ejector according to the present invention is configured to eject, to the outside of the ejector, a combustion product generated by combustion of a pyrotechnic agent accommodated in an accommodating space formed by a metallic cup, which is initiated by combustion of the ignition charge included in the igniter. The pyrotechnic agent may be predetermined gunpowder, which may be selected appropriately depending on the intended use of the combustion product to be ejected, or may be a predetermined gas generating agent. Here, the bottom surface of the cup that forms the accommodating space is disposed opposite the ignition portion of the igniter, and the peripheral wall of the cup is disposed to surround the ignition portion. Therefore, when the pyrotechnic agent is burned by the combustion of the ignition charge at the ignition portion, combustion pressure is applied to the inner wall surface of the cup. The through hole is provided in the bottom surface of the cup, and in an early stage of combustion, the combustion product generated by the combustion of the pyrotechnic agent is partially ejected to the outside through the through hole. Thus, high load (stress) associated with combustion is applied to the through-hole peripheral edges defining the through hole.

Here, the through hole is defined by the plurality of through-hole peripheral edges, and the adjacent through-hole peripheral edges are connected together at a predetermined connection point. The predetermined connection point is a boundary point for distinguishing between the adjacent through-hole peripheral edges. In the invention of the present application, as long as a through-hole peripheral edge changes smoothly, the through-hole peripheral edge is regarded as a single through-hole peripheral edge. In other words, from a geometric viewpoint, as long as tangents to a through-hole peripheral edge are continuous, the through-hole peripheral edge is regarded as a single through hole-peripheral edge. Furthermore, the through hole includes a narrow part having a width decreasing gradually with an increasing distance from the center of the bottom surface toward the peripheral edge of the bottom surface. Here, the width of the through hole is defined as a distance between two through-hole peripheral edges in a direction perpendicular to the direction from the center of the bottom surface toward the peripheral edge of the bottom surface. The width of the through hole defined as the distance between the two through-hole peripheral edges may decrease constantly or exponentially, with an increasing distance from the center of the bottom surface toward the peripheral edge. The two through-hole peripheral edges may be adjacent to each other, or may be opposite to each other, rather than adjacent to each other. In addition, the opening area of the through hole can be correlated with the surface area of the pyrotechnic agent to adjust the combustion of the pyrotechnic agent accommodated in the cup, for example. Note that, when moisture prevention is necessary for the pyrotechnic agent, the through hole may be closed with a known sealing tape formed of aluminum foil or the like. The sealing tape is used to implement airtightness of the interior of the cup and it is preferable to use a sealing tape that does not substantially affect the combustion of the pyrotechnic agent.

In the narrow part, as described above, in which the width of the through hole progressively narrows, the narrowest part is the deepest end thereof (the distal-most part in a direction from the center of the bottom surface toward the peripheral edge). As a result, at an early stage of combustion of the pyrotechnic agent, stress tends to be concentrated most greatly at the deepest end, and thus cleavage can be formed preferentially at the deepest end. In other words, the through hole is shaped to receive the stress, which is generated due to the ejection of the combustion product at the early stage of combustion, in a concentrated manner, particularly at the narrow part of the peripheral edge of the through hole. As a result, at the early stage of combustion, in the bottom surface of the cup, cleavage starting from the narrow part is induced. Further, in the through hole, the narrow part is located closer to the peripheral edge of the bottom surface than a non-narrow part, which is a part other than the narrow part, is located. Thus, the cleavage extending from the narrow part quickly reaches the peripheral edge of the bottom surface and continuously extends up to the peripheral wall, and as a result, the peripheral wall is cleaved in the height direction of the cup, i.e., in the direction from the bottom surface to the igniter (in other words, in a direction away from the bottom surface of the cup). As a result, in the ejector, the combustion gas is no longer blocked by the peripheral wall of the cup, and thus the combustion product generated by combustion of the pyrotechnic agent can be ejected in a direction from the peripheral wall toward the outside of the peripheral wall, in other words, laterally from the ejector.

A high precision machining as required for, for example, the thickness control of thinned parts in the related art is not required for forming this through hole, and thus the through hole can be formed relatively easily. In addition, from a physical perspective, it is possible to ensure that the stress, which is generated at an early stage of combustion, is more concentrated on the narrow part than on the non-narrow part, and thus the above-described cleavage starting from the narrow part up to the peripheral wall occurs with extremely high reproducibility. Therefore, the ejection performance of the combustion product in the ejector according to the present invention is expected to be excellent. Note that, the through hole may include one narrow part or may include a plurality of (for example, from 2 to 10) narrow parts.

Here, in the above-described ejector, the narrow part may include a deepest end formed as a point located closest to the peripheral edge of the bottom surface. When the deepest end of the narrow part is formed as a point, stress can be applied, in a more concentrated and more accurate manner, to the deepest end at the early stage of combustion of the pyrotechnic agent. As a result, it is possible to ensure that the cleavage extends from the narrow part up to the peripheral wall, and thus suitable ejection of the combustion product can be achieved. Note that, even when the deepest end is not formed as a point, as long as the width of the through hole progressively decreases in the narrow part, stress concentration occurs at the early stage of combustion, as described above.

Further, in the ejector described above, at the deepest end, a connection angle formed at the connection point between the two through-hole peripheral edges defining the narrow part may be equal to or less than 120 degrees. The connection angle is defined as an angle formed by tangents, at the connection point, to the two through-hole peripheral edges. The smaller the connection angle is, the narrower and sharper toward the deepest end the shape of the through hole in the narrow part is. Such a narrow and sharp shape allows stress at early stage of combustion to be effectively applied to the deepest end in a concentrated manner. Therefore, in the invention of the present application, the connection angle is preferably set to equal to or less than 120 degrees, and whereby it is possible to initiate cleavage formation at the deepest end more surely.

Further, in the above-described ejector, the narrow part may extend up to the peripheral edge of the bottom surface. With this configuration, it is possible to quickly cleave the peripheral wall by the stress concentrated at the narrow part at the early stage of combustion. In addition, with the peripheral edge of the bottom surface being a site where the peripheral wall and the bottom surface are connected, the peripheral edge of the bottom surface has a relatively higher strength in the cup. Therefore, by forming the narrow part extending up to the peripheral edge, as described above, it is possible to smoothly cleave the peripheral wall when the stress is applied.

Here, in the ejector described above, in the peripheral wall of the cup a fragile part may be formed at a position corresponding to the narrow part, and the fragile part may extend in a longitudinal direction of the cup, that is, in the height direction of the cup, and have a strength lower than those of other parts of the peripheral wall. In this case, the fragile part allows the peripheral wall to cleave along the fragile part. As described above, when stress is concentrated at the narrow part at the early stage of combustion, cleavage starts at the narrow part in the cup. With the fragile part being provided in the peripheral wall, the cleavage, which has started, is properly guided toward the peripheral wall, and thus the combustion product is more surely ejected laterally from the ejector. For example, the fragile part can be provided in the peripheral wall of the cup in the form of a solid line or a dotted or dashed line extending along the height direction of the cup.

Also, in the ejector described above, in the peripheral wall of the cup a stopper configured to stop the cleavage at the fragile part may be formed at a position corresponding to the fragile part between an end on an opposite side of the fragile part to the bottom surface, and a peripheral edge on an opposite side of the peripheral wall to the bottom surface. When the cleavage excessively extends along the fragile part in the perimeter wall, fragments of the peripheral wall may be separated from the cup. Thus, the stopper is provided for preventing the cleavage from excessively extending in the peripheral wall, disabling the combustion product from being ejected. The stopper may be formed to divide the direction of extension of the cleavage that has extended along the fragile part in the peripheral wall.

Here, in the ejector described above, in the accommodating space of the cup a perforated member may be disposed, in the accommodating space of the cup, in a manner to cover the through hole, and the perforated member may include a plurality of holes that are sized not to allow the pyrotechnic agent to pass therethrough. By providing the perforated member in this manner, it is possible to prevent the pyrotechnic agent from escaping through the through hole of the cup to the outside. In addition, the combustion product of the pyrotechnic agent can pass through the holes, and thus it is possible to avoid an occurrence of cleavage that starts from the narrow part in the cup, as described above. Note that, by appropriately adjusting the total opening area of the holes in the perforated member facing the through hole of the cup, it is possible to adjust, in the ejector that uses the perforated member, the combustion performance of the pyrotechnic agent.

Next, two embodiments of the shape of the through hole which can be applicable in the ejector described above are exemplified. First, in a first embodiment, the narrow part may be provided in plurality in the through hole, and the plurality of narrow parts may have a same shape. In this case, in the through hole, the plurality of narrow parts may be arranged at equal intervals along a circumferential direction of the bottom surface, with a center of the bottom surface as a center axis. When the shape of the through hole is defined in this way, each narrow part may receive substantially the same amount of concentrated stress, and this allows, in the cup, each cleavage starting from each narrow part to occur at substantially simultaneously. Thus, the combustion gas can be ejected laterally from the ejector in an even and radial manner.

Further, in a second embodiment, for the narrow part, a reduction amount of a width of the narrow part due to unit-distance displacement from the center of the bottom surface toward the peripheral edge of the bottom surface may be defined as a width-reduction rate of the narrow part, and in this case, the narrow part may be provided in plurality in the through hole, and a width-reduction rate of one of the plurality of narrow parts may be different from a width-reduction rate of another narrow part. When the shape of the through hole is defined in this way, concentrated stress applied to each of the narrow parts can be intentionally adjusted, and thus, in the cup, a start timing of cleavage that starts from the narrow part can be controlled. The smaller the width-reduction rate in the narrow part is, the narrower and shaper the narrow part is. Thus, it is possible to increase the stress applied to the narrow part, and thus cause cleavage to start earlier. Therefore, when it is desired to intentionally cause the combustion product to be ejected preferentially in a predetermined direction with the ejector being located at a center, the through hole may be formed to include a narrow part that has a width-reduction rate appropriately set and that is located appropriately, by taking the predetermined direction into account.

Furthermore, the gas generator may be formed by using the ejector described above. The gas generator may include the above-described ejector and a housing including a gas discharge port for discharging combustion gas generated by combustion of a gas generating agent, the housing being configured to accommodate therein the ejector and the gas generating agent, and in the gas generator, the ejector is disposed in the housing in a manner in which the bottom surface faces an inner wall surface of the housing and the gas generating agent is disposed along the peripheral wall. In the gas generator configured as described above, a combustion product ejected from the ejector is used to burn the gas generating agent in the housing thereby generating combustion gas, and the combustion gas is discharged from the gas discharge port. As described above, with the ejector according to the invention of the present application, it is possible to suitably eject the combustion product toward the gas generating agent disposed along the ejector. Therefore, in the gas generator, uneven combustion of the gas generating agent can also be suppressed as much as possible, and thus the gas generator can exhibit an excellent combustion gas generation performance.

In the gas generator configured by using the ejector according to the invention of the present application, it may be desired to cause the combustion product to be ejected preferentially in a predetermined direction with the ejector being located at a center, as described above. For example, in a gas generator including the above-described ejector and the above-described housing, the width-reduction rate of the narrow part is defined as described above. In the gas generator, for example, the narrow part may be formed in plurality in the through hole, and a width-reduction rate in a narrow part of the plurality of narrow parts may be smaller than a width-reduction rate of another narrow part, and, in a state where the ejector may be accommodated in the housing with an uneven combustion distance from the ejector with regard to the gas generating agent disposed between the housing and the ejector, the narrow part may be oriented, inside the housing, toward a distal region in which the combustion distance from the ejector is longest, and the other narrow part may be oriented, inside the housing, toward a proximal region in which the combustion distance from the ejector is shorter than the combustion distance in the distal region. Note that the combustion distance in relation to the gas generating agent in the invention of the present application is a distance of propagation of the combustion of the gas generating agent, which is caused by the combustion product ejected from the ejector, in other words, the combustion distance is a width of a region, in which the gas generating agent is present, and, which extends on the extended line of the ejection direction of the combustion product. However, the definition of the combustion distance does not change even when anything other than the gas generating agent exists on the extended line of the ejection direction of the combustion product. In addition, the distal region is not represented as a point, and the distal region is represented as a region having a certain size of area including a point at which the combustion distance from the ejector is longest. In a case of an uneven combustion distance with regard to the gas generating agent in the housing, as described above, it is considered that combustion of the gas generating agent in the distal region, in which the combustion distance from the ejector is relatively long, completes later than combustion of the gas generating agent at the distal distance, in which the combustion distance is relatively short. Here, with cleavage by concentrated stress at the narrow part, which has a relatively low width-reduction rate, occurring earlier than cleavage at the other narrow part, then by orienting the first narrow part toward the distal region and orienting the other narrow parts toward the proximal regions, the combustion product can be ejected preferentially toward the distal region. As a result, the gas generating agent, which is located relatively far from the ejector, can be more surely burned, and thus, it is possible to evenly achieve combustion of the gas generating agent in the housing, together with the gas generating agent at a proximal position. As a result, the gas generator can exhibit an excellent combustion gas generating performance.

Advantageous Effects of Invention

With the present invention, it is possible to suitably eject laterally from the ejector, the combustion product of the pyrotechnic agent in the desired direction.

DESCRIPTION OF EMBODIMENTS

An ejector and a gas generator according to embodiments of the present invention are described below with reference to the drawings. Note that configurations of the following embodiments are exemplary, and the present invention is not limited to the configurations of these embodiments.

Example 1

Figure 1:
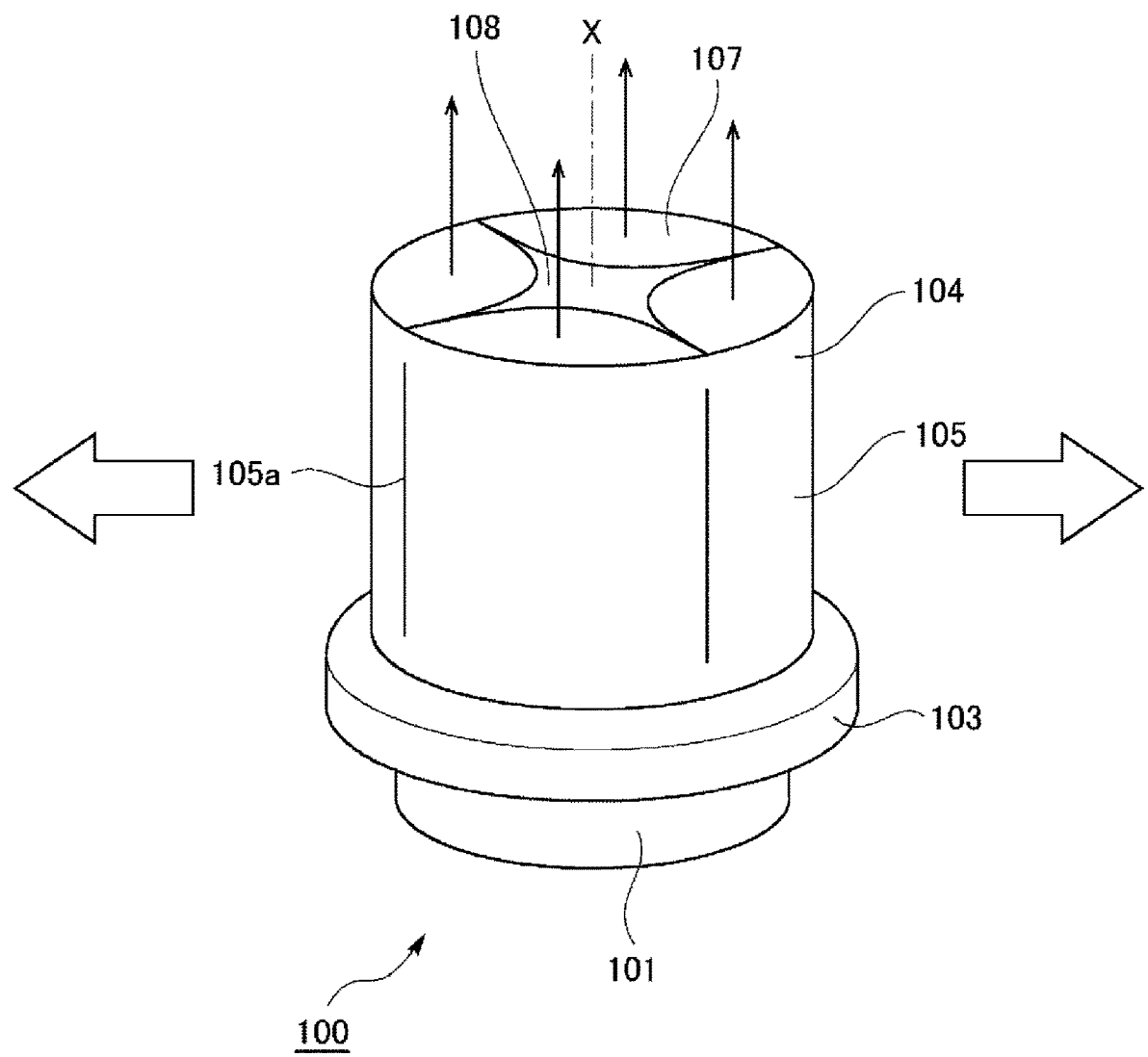
FIG. 1 is a schematic diagram illustrating a configuration of an ejector according to an embodiment of the present invention.
Figure 2A:
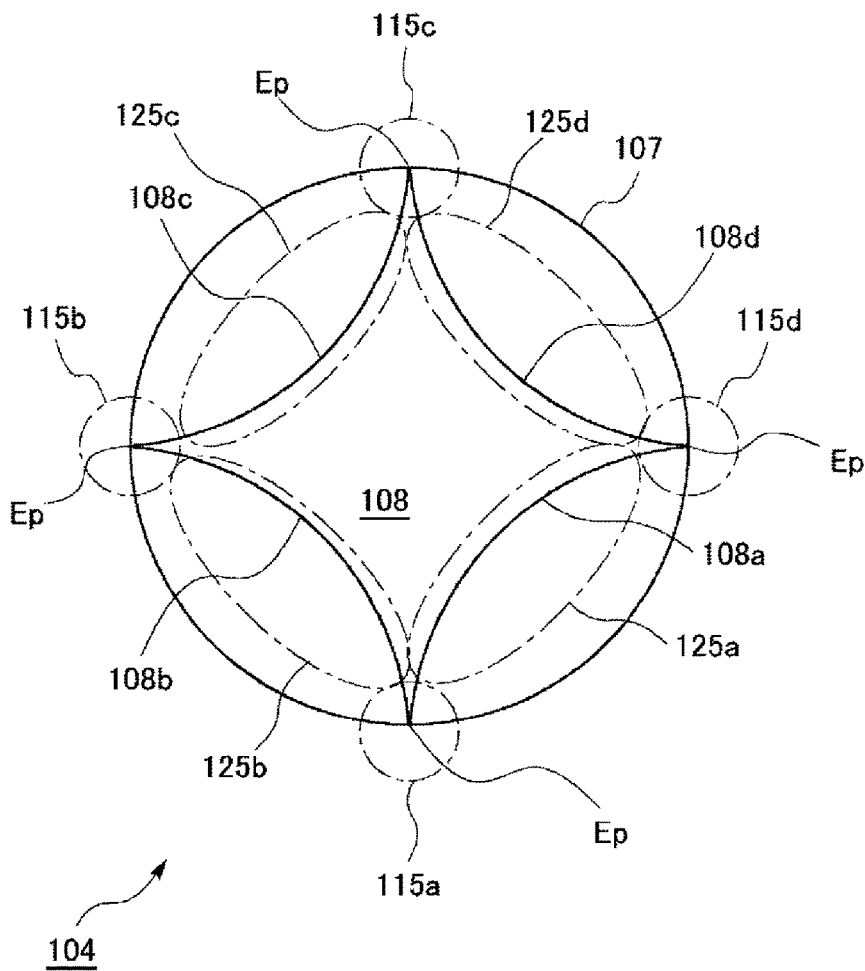
FIG. 2A is a top view of a cup included in the ejector illustrated in FIG. 1.
Figure 2B:
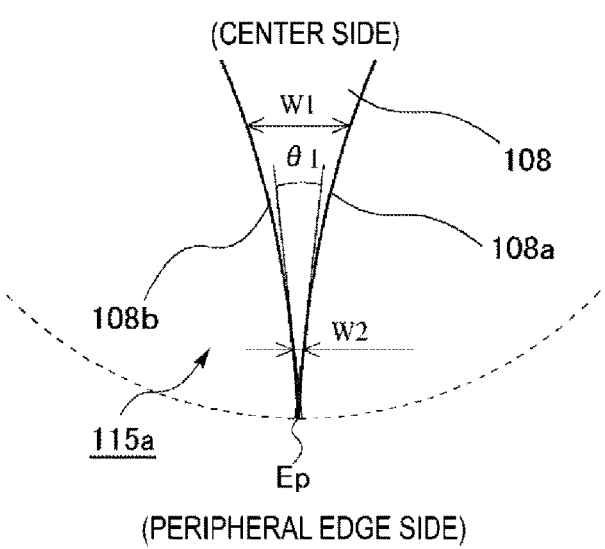
FIG. 2B is a top view of a cup included in the ejector illustrated in FIG. 1.
Figure 3:
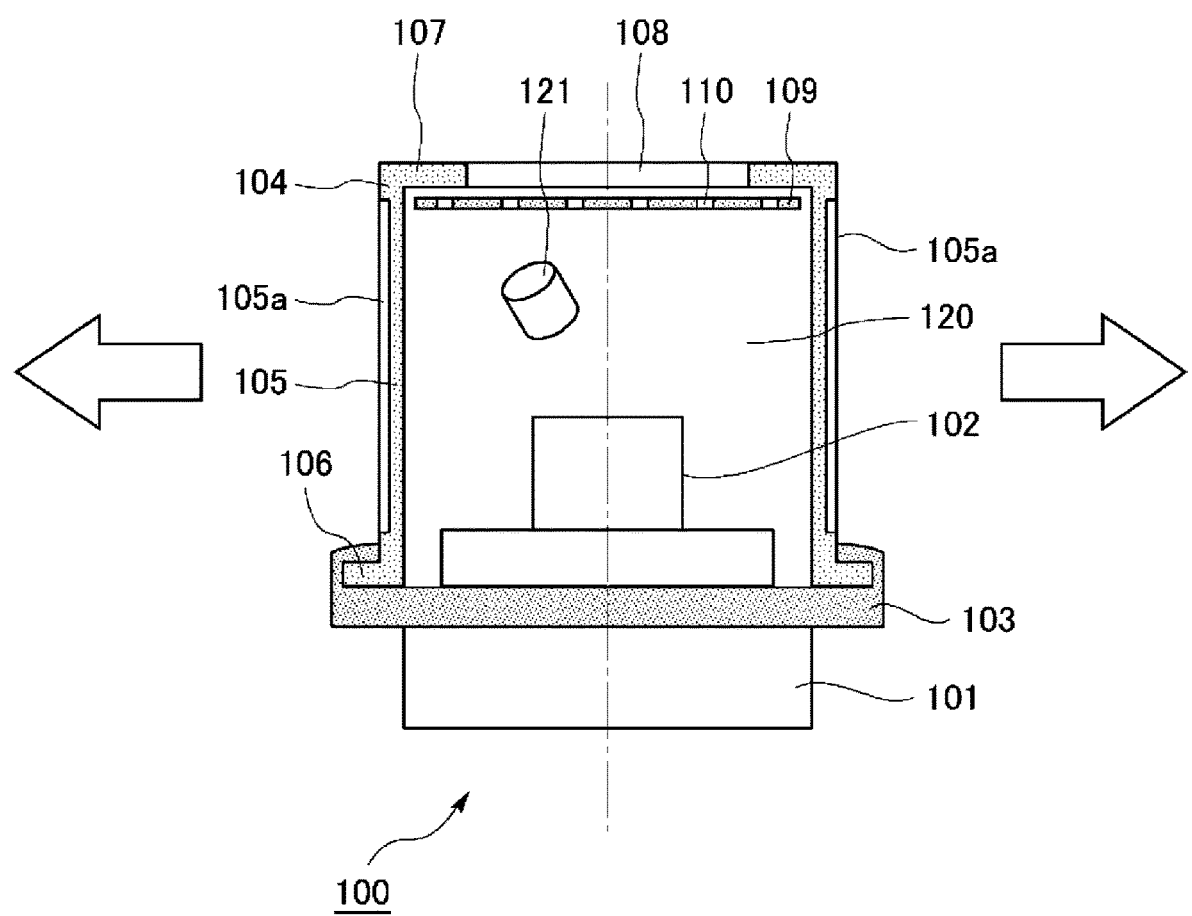
FIG. 3 is a cross-sectional view of the ejector illustrated in FIG. 1.

FIG. 1 is a schematic diagram illustrating a configuration of an ejector 100 configured to eject a combustion product of a gas generating agent to the outside; FIG. 2A and FIG. 2B are a top view of a cup 104 used in the ejector 100; and FIG. 3 is a cross-sectional view of the ejector 100. The ejector 100 includes an electrical igniter (hereinafter simply referred to as an "igniter") 101 attached to a base member 103 and a metallic cup 104 covering an ignition portion 102 of the igniter 101. The ejector 100 is configured to burn a gas generating agent 121 (a pyrotechnic agent) filled in an accommodating space 120 formed between the igniter 101 and the cup 104, and eject the combustion gas, which is a combustion product of the gas generating agent 121, laterally from the ejector 100. The igniter 101 is configured to receive an ignition current supplied from an external source and burn an ignition charge included in the ignition portion 102. Due to the generation of a combustion product resulting from burning of the ignition charge, an outer shell that forms the ignition portion is cleaved, and the combustion product is ejected toward the gas generating agent 121 in the accommodating space 120.

The cup 104 of the ejector 100 includes: a bottom surface 107 that is substantially circular and provided opposite the ignition portion 102; and a peripheral wall 105 that is contiguous with the peripheral edge of the bottom surface 107 and surrounds the ignition portion 102. Furthermore, a flange 106 is provided at a part of peripheral edges of the peripheral wall 105, which is a peripheral edge not contiguous with the bottom surface 107, and the flange 106 and the base member 103 are joined by crimping. In the state in which the flange 106 and the base member 103 are joined by crimping, a space that is formed inside the cup 104 serves as the accommodating space 120. The accommodating space 120 is filled with the gas generating agent 121. As the gas generating agent 121, a suitable pyrotechnic agent is selected, which allows the combustion gas ejected by the ejector 100 to be used as a suitable driving source for a predetermined device, etc., which is to be driven by the combustion gas. For example, when a relatively low gas temperature (for example, in a range from 1000 to 1700° C.) is preferable as a driving source, a composition including guanidine nitrate (41 wt. %), basic copper nitrate (49 wt. %), and a binder and/or an additive may be used. On the other hand, when a relatively high gas temperature (for example, in a range from 1700 to 3000° C.) is preferable, a composition including nitroguanidine (34 wt. %) and strontium nitrate (56 wt. %) may be used. Regarding a shape of the pyrotechnic agent, a suitable shape, such as a disc shape, a pellet shape, or a cylindrical shape having a hole, in which a through hole or a non-through hole extending from one end surface toward the opposite end surface is formed, may be adopted as appropriate.

A through-hole 108 that allows the accommodating space 120, which is the internal space of the cup 104, to communicate with the outside of the cup 104 is formed in the bottom surface 107 of the cup 104. Opening area of the entire through-hole 108 is relatively large, thus allowing the granular gas generating agent 121 to pass through the through-hole 108. Therefore, a perforated member 109 having a large number of holes sized not to allow the granular gas generating agent 121 to pass therethrough is disposed to cover the through-hole 108 from the accommodating space 120 side, whereby the gas generating agent 121 filled in the accommodating space 120 is prevented from going out through the through-hole 108 to the outside. In addition, the size of the holes of the perforated member 109 has to be set to a size that does not restrict a flow of the combustion gas, which is generated by combustion of the gas generating agent 121 due to actuation of the igniter 101, toward the through-hole 108. The perforated member 109 may be, for example, a member in which the holes having the size as described above are arranged in a lattice-like manner, or may be a member including, in a mesh-like manner, a large number of holes that have a relatively smaller size than the size of the granular gas generating agent. In the perforated member 109, the total opening area of holes that face the through-hole 108 is appropriately adjusted to achieve sufficient strength that allows prevention of breakage due to combustion pressure generated by combustion of the gas generating agent 121 at a time when the igniter 101 is actuated, and to achieve optimal combustion of the gas generating agent 121.

Here, the shape of the through-hole 108 will be described based on FIG. 2. FIG. 2A is a top view of the cup 104, and FIG. 2B is an enlarged view of a narrow part 115a of the through-hole 108. Note that, in FIG. 2B, the peripheral edge of the bottom surface 107 is represented by a dotted line. The through-hole 108 is defined by four through-hole peripheral edges 108a, 108b, 108c, and 108d, all of which are arcs. The through-hole peripheral edges adjacent to each other are formed to protrude toward the inner side (toward the center of the bottom surface 107), and connected together in a manner in which a connection angle, which is defined as an angle formed between tangents of the through-hole peripheral edges at each connection point between the through-hole peripheral edges, is equal to or less than a predetermined angle (for example, 120 degrees), where the connection angle. In FIG. 2B, the connection angle between the through-hole peripheral edges 108a and 108b is represented by θ1. In addition, all of the through-hole peripheral edges 108a, 108b, 108c, and 108d have the same size and shape, the center of the through-hole 108 coincides with the center of the bottom surface 107, and the through-hole 108 has a shape that is point symmetric about the center.

In addition, as illustrated in FIG. 2B, the through-hole 108 includes four narrow parts 115 in which the width of the through-hole 108 decreases as a distance from the center of the bottom surface 107 increases toward the peripheral edge of the bottom surface 107. Note that the width of the through-hole 108 is defined by each of parts of the two through-hole peripheral edges that define the through-hole 108, in a direction perpendicular to the radius of the bottom surface 107, where the through-hole 108 is provided. In the through-hole 108 illustrated in FIG. 2, the width of the through-hole 108 is defined by each of parts of the two adjacent through-hole peripheral edges 108a and 108b near the connection point between the through-hole peripheral edges 108a and 108b, as illustrated in FIG. 2B. In addition, when each of the narrow parts 115 has to be identified individually, these parts are indicated by adding symbols, a, b, c, or d, to the reference numeral "115" for distinction. For example, a narrow part formed between the through-hole peripheral edges 108a and 108b is referred to as 115a, a narrow part formed between the through-hole peripheral edges 108b and 108c is referred to as 115b, a narrow part formed between the through-hole peripheral edges 108c and 108d is referred to as 115c, and a narrow part formed between the through-hole peripheral edges 108d and 108a is referred to as 115d.

Next, the narrow part 115a will be described as a representative. As described above, in the narrow part 115a, the width of the through-hole 108 decreases as a distance from the center of the bottom surface 107 increases toward the peripheral edge, and the deepest point of the narrow part 115a is a deepest end Ep (in the present example, the connection point between the through-hole peripheral edge 108a and the through-hole peripheral edge 108b). As illustrated in FIG. 2B, the width of the through-hole 108 on the center side is represented by W1, for example, and the width of the through-hole 108 on the peripheral edge side is represented by W2 (W2<W1). Further, the deepest end Ep is a part that is closest, in the narrow part 115a, to the peripheral edge of the bottom surface 107. In the present example, the deepest end Ep is positioned substantially on the peripheral edge of the bottom surface 107. Note that, the configurations of the narrow parts 115b, 115c, and 115d are the same as that of the narrow part 115a.

Furthermore, in each of the through-hole peripheral edge 108a and the other through-hole peripheral edges, which define the through-hole 108, a part which does not form the narrow part 115a or the other narrow parts is referred to as a non-narrow part. In FIG. 2A, a non-narrow part 125a is defined between the narrow parts 115a and 115d. Similarly, a non-narrow part 125b is defined between the narrow parts 115a and 115b, a non-narrow part 125c is defined between the narrow parts 115b and 115c, and a non-narrow part 125d is defined between the narrow parts 115c and 115d. As illustrated in FIG. 2, the narrow part 115a and the other narrow parts are positioned closer to the peripheral edge of the bottom surface 107 than the non-narrow part 125a and the other non-narrow parts are. In other words, the through-hole 108 has a shape including the narrow part 115a and the other narrow parts, which are closer to the peripheral edge of the bottom surface 107, and the non-narrow part 125a and the other non-narrow parts, which are farther from the peripheral edge of the bottom surface 107.

In the cup 104 including the above-described through-hole 108, when the igniter 101 is actuated, and then the gas generating agent 121 filled in the accommodating space 120 is burned, combustion gas is generated in the cup 104. Here, since the through-hole 108 is provided in the cup 104, a flow of the generated combustion gas that exits through the through-hole 108 to the outside is formed. In this situation, the bottom surface 107 of the cup 104 is situated in a manner to resist the flow. Thus, at an early stage of generation of the combustion gas (an early stage of combustion of the gas generating agent 121), the combustion gas applies resistance force to the bottom surface 107 (upward arrows in FIG. 1 represent the resistance force).

In particular, the through-hole 108 includes the narrow part 115a and the other narrow parts and the non-narrow part 125a and the other non-narrow parts, as described above, and the load of the combustion gas tends to be mainly applied to the non-narrow part 125. Here, with the narrow part 115a and the other narrow parts being formed between the non-narrow part 125a and the other non-narrow parts, and with the width of the through-hole 108 progressively narrowing toward the deepest ends Ep, stress that is generated by the resistance to the combustion gas that flows from the inside of the cup 104 increases, toward the deepest ends Ep of the narrow part 115a and the other narrow parts, along the two through-hole peripheral edges defining the narrow part 115a and the other narrow parts (e.g., the two through-hole peripheral edges 108a and 108b defining the narrow part 115a), hence, at and near the deepest ends Ep, the stress applied to the bottom surface 107 is extremely high. On the other hand, the non-narrow part 125a and the other non-narrow parts receive pressure force that allows the non-narrow part 125a and the other non-narrow parts to deform in the axial direction of the cup 104, but the non-narrow part 125a and the other non-narrow parts do not include a part where stress tends to concentrate unlike the narrow part 115a or the other narrow parts. In a case where the through-hole 108 having the above-described shape is provided in the bottom surface 107, it is possible to provide, at or near the deepest end Ep, a part where stress to the bottom surface 107 tends to be concentrated at the early stage of combustion of the gas generating agent 121, and thus, cleavage formation in the cup 104 can be controlled.

As a result, at the early stage of combustion of the gas generating agent 121, stress is concentrated on a part located at or near the deepest end Ep on the bottom surface 107, and thus, it is possible to form cleavage preferentially at that part, which serves as a starting point of cleavage, over the other parts, in the bottom surface 107. In addition, as described above, the narrow part 115a and the other narrow parts including the deepest end Ep are positioned closer to the peripheral edge of the bottom surface 107 than the non-narrow part 125a and the other non-narrow parts are, and thus the cleavage that starts from the part located at or near the deepest end Ep in the bottom surface 107 quickly reaches the peripheral edge of the bottom surface 107, and continues to the peripheral wall 105. In other words, the non-narrow part 125a and the other non-narrow parts have a shape in which stress concentration does not easily occur, and are disposed away from the peripheral edge of the bottom surface 107, hence cleavage that starts at the non-narrow part 125a and the other non-narrow parts in the bottom surface 107 is less likely to occur, and, even if it occurs, the cleavage does not easily reach the peripheral wall 105.

As described above, in the ejector 100, at the early stage of combustion of the gas generating agent 121 by the actuation of the igniter 101, stress is concentrated at a predetermined part (a part located at or near the deepest end Ep) in the bottom surface 107, and as a result, cleavage starts at the predetermined part in the bottom surface 107, and the cleavage continues in the peripheral wall 105. In addition, since the cleavage starts at the bottom surface 107, it is expected that the cleavage in the peripheral wall 105 extends along the height direction (longitudinal direction) of the cup 104. In the present example, the peripheral wall 105 includes, at positions corresponding to the four narrow parts including the narrow part 115a and the other narrow parts, thinned parts 105a extending in the height direction of the cup 104, whereby cleavage is induced in the peripheral wall 105 in the height direction of the cup 104. The thickness of the thinned part 105a is thinner than those of the other parts of the peripheral wall 105, and thus the thinned part 105a is relatively fragile. When the peripheral wall 105 is cleaved in the height direction of the cup 104, as described above, a state in which the ejector 100 is released at the side thereof is established. As a result, the combustion gas generated after the early stage of combustion is ejected also laterally from the ejector 100 (in directions of white arrows illustrated in FIGS. 1 and 3).

In addition, the predetermined part, where stress is concentrated, in the bottom surface 107 in the present example is dependent on the shape of the through-hole 108, therefore, the cleavage can be started, as intended and with high reproducibility, in the cup 104. Since all of the narrow part 115a and the other narrow parts of the ejector 100 are formed to have the same shape, the cleavage starts from each of the narrow parts 115 to extend in the bottom surface 107 and the peripheral wall 105 in a substantially same manner. Thus, the combustion gas can be ejected laterally from the ejector 100 in an even and radial manner.

Furthermore, the through-hole 108 can be relatively easily formed by using a press machine or the like, and manufacturing load thereof is significantly reduced compared to that required for performing thickness control on the thinned scores or the like in the related art. Note that since the thinned part 105a in the peripheral wall 105 of the cup 104 is provided to guide the direction of the cleavage that has already started in the cup 104, the thickness of the thinned part 105a does not have to be precisely adjusted.

Modified Example 1

Figure 4:
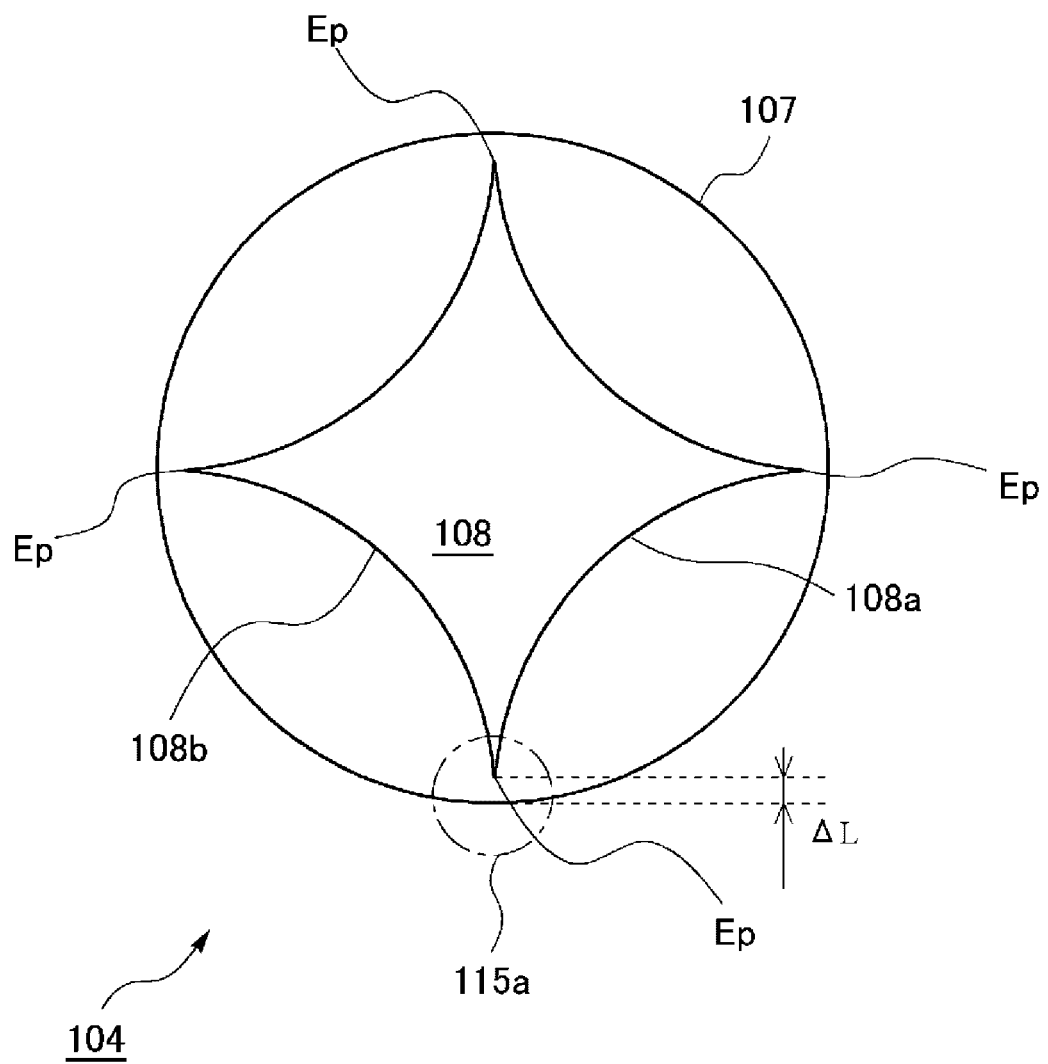
FIG. 4 is a top view of a cup included in an ejector according to a first modified example.

A first modified example of the ejector 100 will be described based on FIG. 4. FIG. 4 is a top view of the cup 104. The difference between the present modified example and the first example is that the terminal end of the narrow part 115a of the through-hole 108 does not reach the peripheral edge of the bottom surface 107. In other words, in the present modified example, a distance of ΔL exists between the deepest end Ep of the narrow part 115a and the peripheral edge of the bottom surface 107. Even when the through-hole 108 is formed in this manner, once the igniter 101 is actuated and the gas generating agent 121 is burned thereby generating combustion gas, a load is concentrated at the narrow part 115a and the other narrow parts of the through-hole 108. As a result, cleavage that starts at the narrow part 115a and the other narrow parts occurs in the bottom surface 107. After reaching the peripheral edge of the bottom surface 107, the cleavage continuously extends, in the peripheral wall 105 in the height direction of the cup 104 similarly to the above-described example, and as a result, the combustion gas can be ejected laterally from the ejector 100.

Modified Example 2

Figure 5:
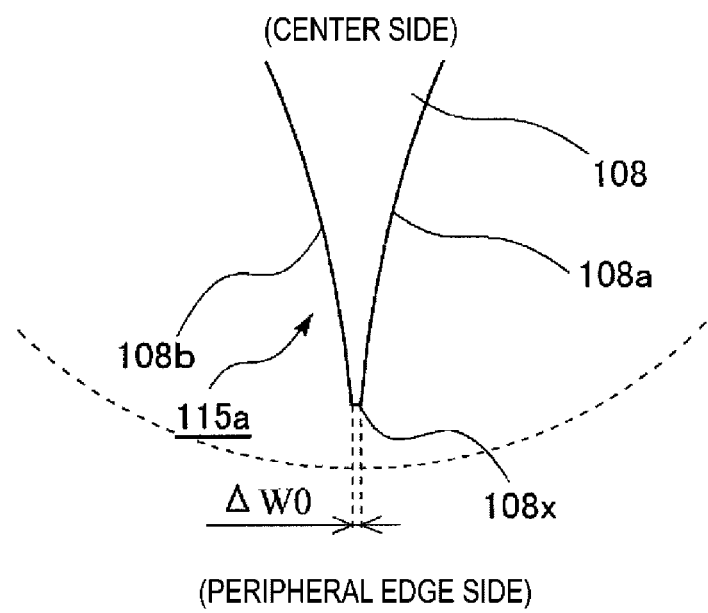
FIG. 5 is an enlarged view of a top of a cup included in an ejector according to a second modified example.

A second modified example of the ejector 100 will be described based on FIG. 5. FIG. 5 is a partial enlarged view of the through-hole 108 provided in the cup 104, illustrating the narrow part 115a and a vicinity thereof. The difference between the present modified example and the first modified example is that in this modified example the through-hole peripheral edge 108a and the through-hole peripheral edge 108b are not directly connected, and the through-hole peripheral edge 108a and the through-hole peripheral edge 108b are connected with an extremely short other through-hole peripheral edge 108x interposed therebetween. The length of the through-hole peripheral edge 108x is ΔW0. In this case, the width of the through-hole 108 is a distance between the through-hole peripheral edge 108a and the through-hole peripheral edge 108b, which face each other, along a direction perpendicular to the radius of the bottom surface 107. Also in FIG. 5, the width of the through-hole 108 in the narrow part 115a decreases gradually with an increasing distance from the center of the bottom surface 107 toward the peripheral edge. Also in a case where the through-hole 108 is formed in this manner, once the igniter 101 is actuated and the gas generating agent 121 is burned thereby generating combustion gas, a load is concentrated at the narrow part 115a and the other narrow parts of the through-hole 108. As a result, cleavage that starts at the narrow part 115a and the other narrow parts occurs in the bottom surface 107. After reaching the peripheral edge of the bottom surface 107, the cleavage continuously extends in the peripheral wall 105 in the height direction of the cup 104, similarly to the above-described example, and as a result, the combustion gas can be ejected laterally from the ejector 100.

Modified Example 3

A third modified example of the ejector 100 will be described based on FIGS. 6 to 9. FIGS. 6 to 9 are top views of the cup 104. The present modified example is different from the first example in the shape of the through-hole 108. In the figures relating to the present modified example, the narrow part 115a defined by the through-hole peripheral edge 108a and the through-hole peripheral edge 108b is illustrated as an example of the narrow part of the through-hole 108, but a person skilled in the art can understood, based on the drawings, that the through-hole 108 may be another narrow part having a similar configuration.

Figure 6:
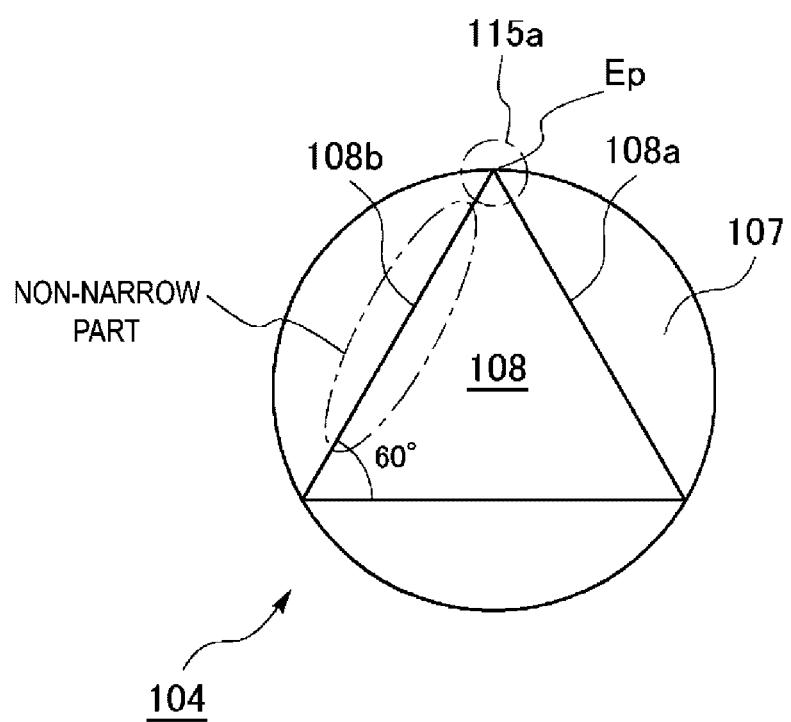
FIG. 6 is a first diagram illustrating a variation of the through hole formed in the ejector according to the present invention.
Figure 7:
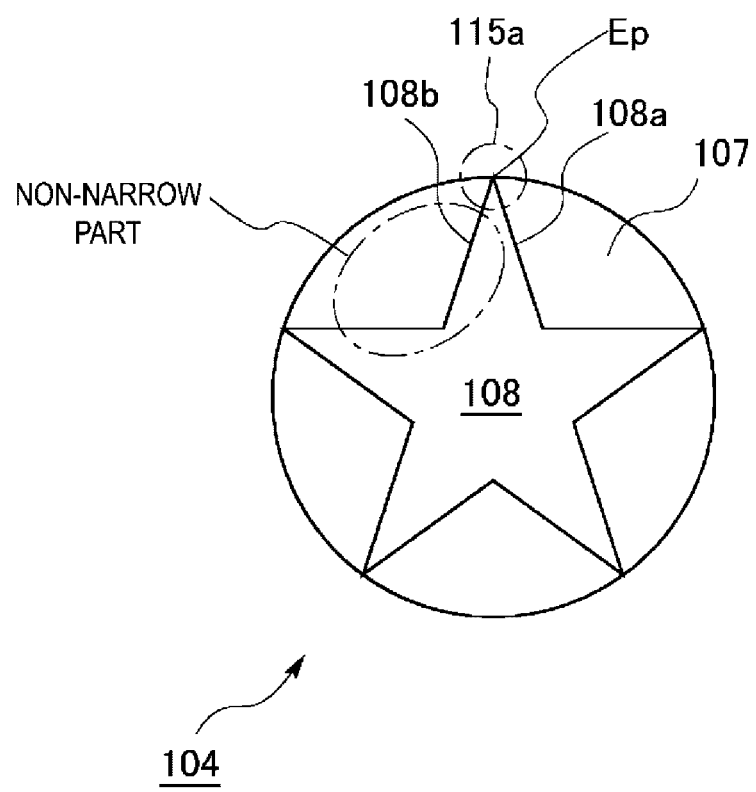
FIG. 7 is a second diagram illustrating a variation of the through hole formed in the ejector according to the present invention.

First, in a variation illustrated in FIG. 6, the through-hole 108 is formed to be an equilateral triangle. In this case, three through-hole peripheral edges that form the through-hole 108 are straight. Furthermore, three identically-shaped narrow parts including the narrow part 115a illustrated in FIG. 6 are arranged evenly along the peripheral edge of the bottom surface 107. Non-narrow parts each defined between two narrow parts are farther from the peripheral edge than the narrow parts. Next, in a variation illustrated in FIG. 7, the through-hole 108 having a so-called star shape is formed. In this case, ten through-hole peripheral edges that form the through-hole 108 are straight. Furthermore, five identically-shaped narrow parts including the narrow part 115a illustrated in FIG. 7 are arranged evenly along the peripheral edge of the bottom surface 107. Non-narrow parts each defined between two narrow parts are farther from the peripheral edge than the narrow parts.

Figure 8:
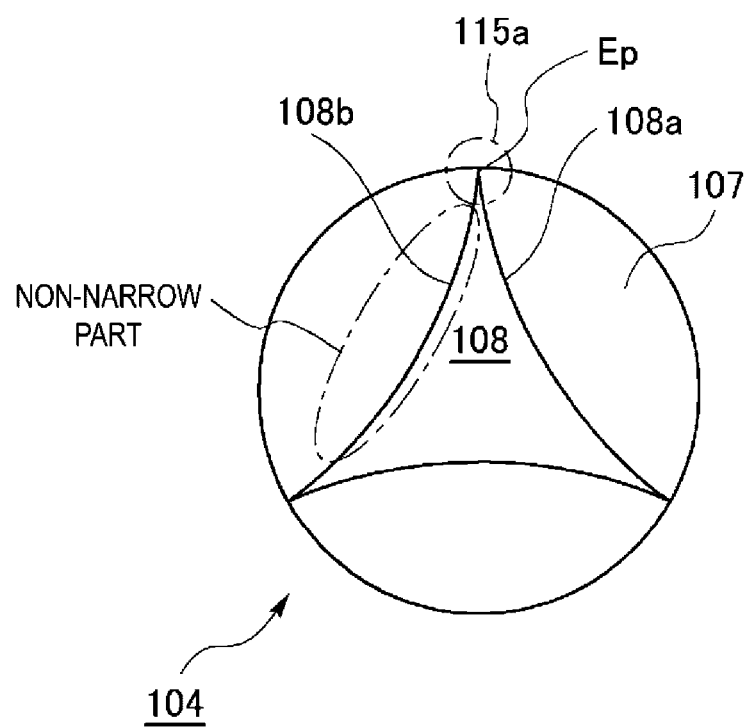
FIG. 8 is a third diagram illustrating a variation of the through hole formed in the ejector according to the present invention.
Figure 9:
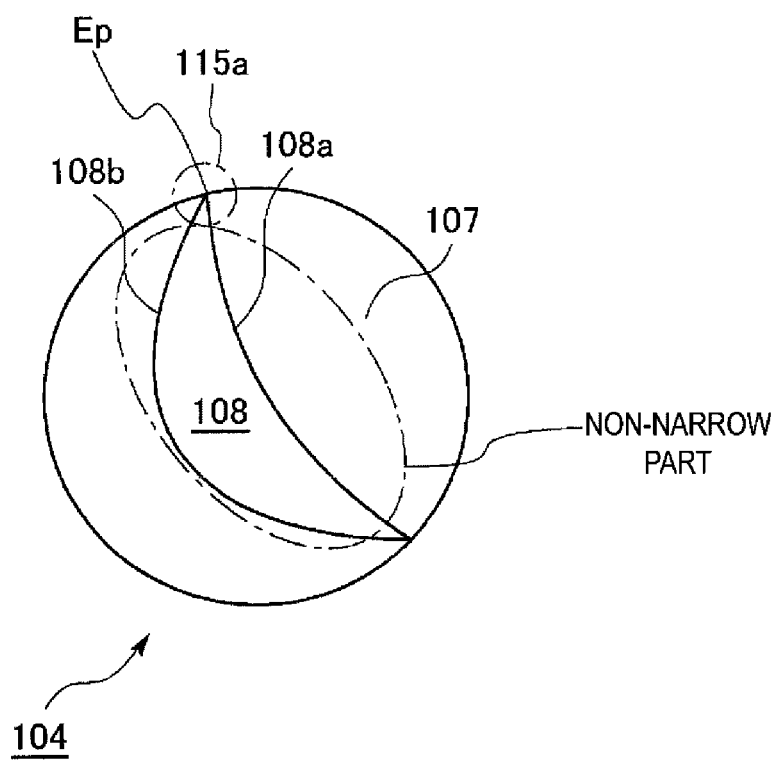
FIG. 9 is a fourth diagram illustrating a variation of the through hole formed in the ejector according to the present invention.

In a variation illustrated in FIG. 8, the through-hole 108 is formed by three arcs having the same shape. Furthermore, three identically-shaped narrow parts including the narrow part 115a illustrated in FIG. 8 are arranged evenly along the peripheral edge of the bottom surface 107. Non-narrow parts each defined between two narrow parts are farther from the peripheral edge than the narrow parts. Finally, in a variation illustrated in FIG. 9, the through-hole 108 is formed by two arcs having different shapes and has a so-called crescent shape. Furthermore, two identically-shaped narrow parts including the narrow part 115a illustrated in FIG. 9 are arranged along the peripheral edge of the bottom surface 107. Non-narrow parts each defined between two narrow parts are farther from the peripheral edge than the narrow parts.

Also in a case where the through-hole 108 is formed as illustrated in FIGS. 6 to 9, once the igniter 101 is actuated and the gas generating agent 121 is burned thereby generating combustion gas, a load is concentrated at the narrow part 115a and the other narrow parts of the through-hole 108. As a result, cleavage that starts at the narrow part 115a and the other narrow parts occurs in the bottom surface 107. After reaching the peripheral edge of the bottom surface 107, the cleavage continuously extends in the peripheral wall 105 in the height direction of the cup 104, similarly to the above-described example, and as a result, the combustion gas can be ejected laterally from the ejector 100.

Modified Example 4

Figure 10:
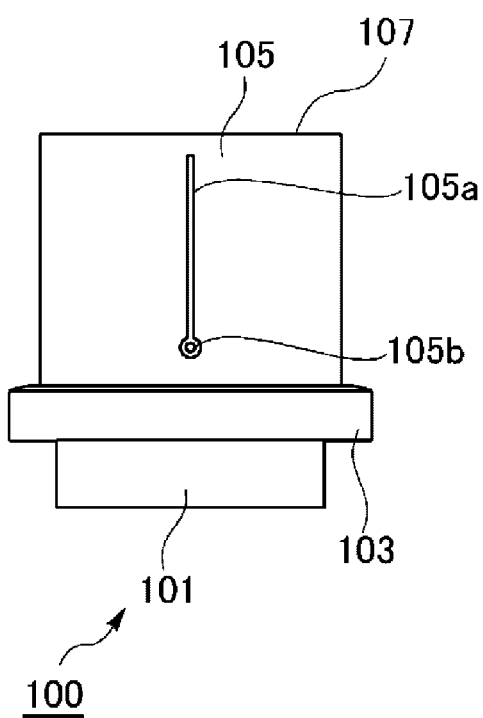
FIG. 10 is a first diagram illustrating a variation of a thinned part formed in a peripheral wall of the ejector according to the present invention.
Figure 11:
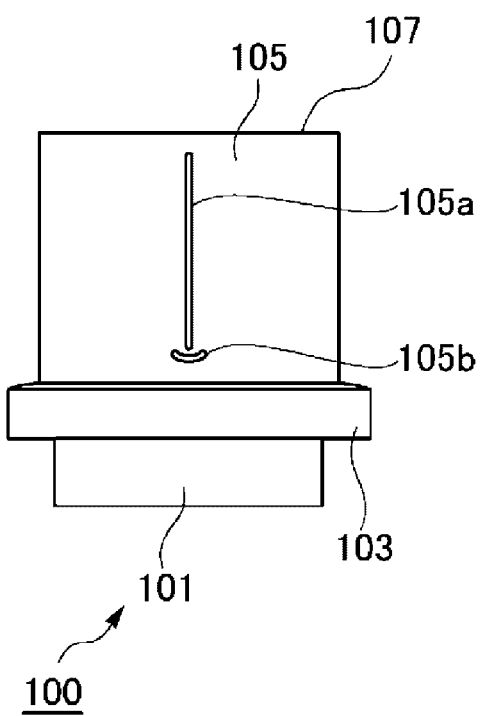
FIG. 11 is a second diagram illustrating a variation of the thinned part formed in the peripheral wall of the ejector according to the present invention.
Figure 12:
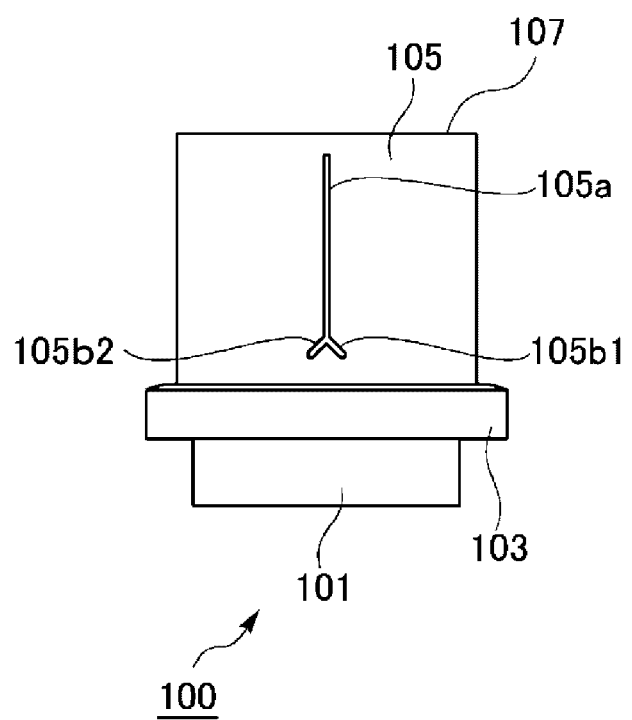
FIG. 12 is a third diagram illustrating a variation of the thinned part formed in the peripheral wall of the ejector according to the present invention.

A fourth modified example of the ejector 100 will be described based on FIGS. 10 to 12. FIG. 10 is a side view of the ejector 100. The present modified example is different from the first example in a structure relating to a thinned part provided in the peripheral wall 105. In the first example described above, the peripheral wall 105 includes the thinned parts 105a configured to promote cleavage in the peripheral wall 105 in the height direction of the cup 104. In the present modified example, a thinned part for stopping configured to stop, at a predetermined position, the cleavage in the peripheral wall 105 is provided.

Specifically, in a variation illustrated in FIG. 10, at a terminal end of the thinned part 105a, which is a terminal end on the igniter 101 side (i.e., a terminal end on the opposite side of the thinned part to the bottom surface 107), a ring-shaped thinned part 105b adjacent to the thinned part 105a is provided. Note that the thinned part 105b is not continuous with the peripheral edge of the peripheral wall 105 on the igniter 101 side. When the ring-shaped thinned part 105b like this is employed, stress causing cleavage that extends in the thinned part 105a is deconcentrated at the ring-shaped thinned part 105b and then weaken, thus further extension of the cleavage in the peripheral wall 105 is stopped. Further, in a variation illustrated in FIG. 11, at a terminal end of the thinned part 105a, which is a terminal end on the igniter 101 side, an arcuate thinned part 105b spaced apart from the thinned part 105a is provided. Note that the thinned part 105b is not continuous with the peripheral edge of the peripheral wall 105 on the igniter 101 side. When the arcuate thinned part 105b like this is employed, the stress causing cleavage that extends in the thinned part 105a is similarly deconcentrated at the thinned part 105b and then weaken, and thus further extension of the cleavage in the peripheral wall 105 is stopped. Further, in a variation illustrated in FIG. 12, at a terminal end of the thinned part 105a, which is a terminal end on the igniter 101 side, thinned parts 105b1 and 105b2 formed continuously with the thinned part 105a and bifurcated in two directions are provided. Note that both of the thinned parts 105b1 and 105b2 are not continuous with the peripheral edge of the peripheral wall 105 on the igniter 101 side. When the thinned parts 105b1 and 105b2 bifurcated in two directions is employed, stress causing cleavage that extends in the thinned part 105a is similarly deconcentrated and then weaken by the thinned parts 105b1 and 105b2, and thus further extension of the cleavage in the peripheral wall 105 is prevented.

As described above, when the thinned part 105b (105b1 and 105b2) for stopping configured to stop, at a predetermined position, the cleavage in the peripheral wall 105 is provided, fragments of the peripheral wall 105, which are made due to cleavage created for ejecting the combustion gas laterally, remain attached to the body of the cup 104, and as a result, separation of the fragments due to the ejection of the combustion gas can be prevented. The thinned parts 105b (105b1 and 105b2) each are disposed at a predetermined position located between the terminal end of the thinned part 105a and the peripheral edge of the peripheral wall 105 to ensure sufficient strength at which the fragments of the peripheral wall 105 after the cleavage are held and the peripheral wall 105 is partially removed to eject the combustion gas laterally and smoothly.

Example 2

Figure 13:
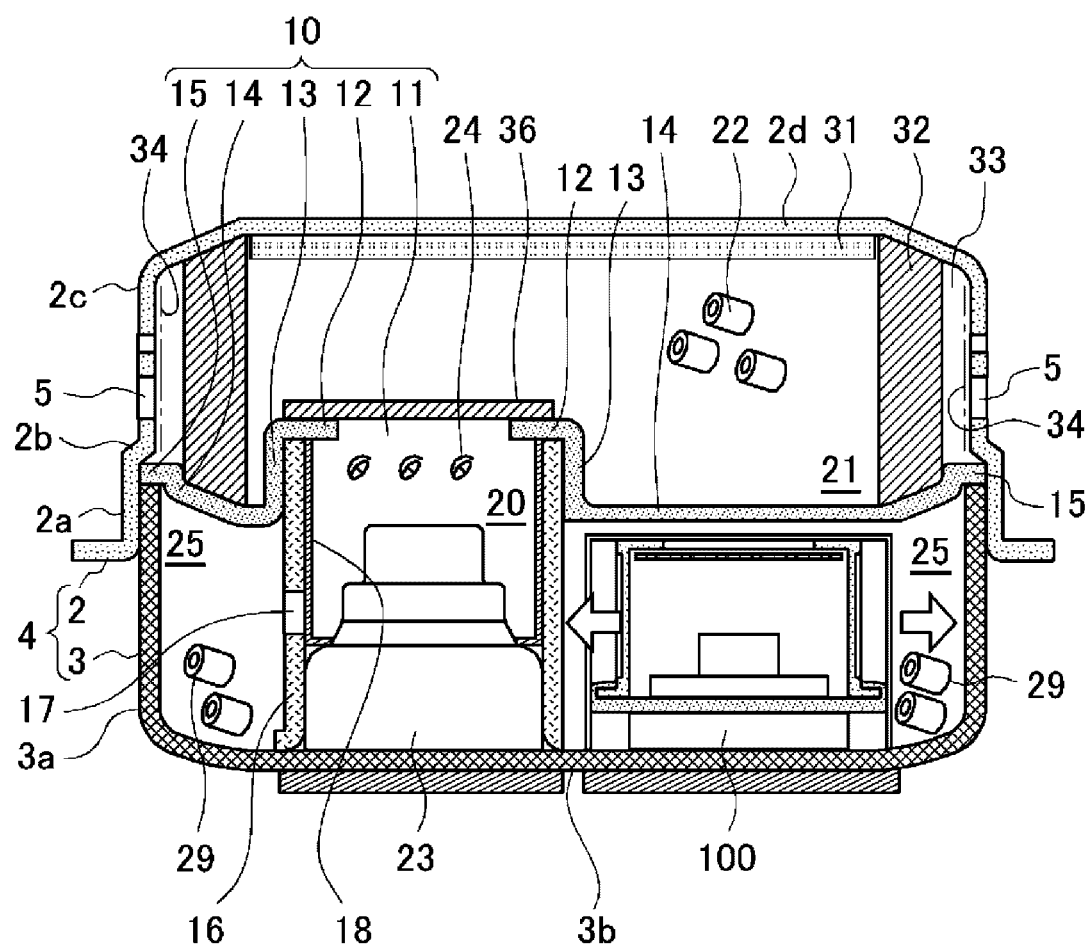
FIG. 13 is a schematic diagram illustrating a configuration of a gas generator including an ejector according to the present invention.

A gas generator 1 including the ejector 100 of the above-described first example will be described based on FIG. 13. FIG. 13 is a cross-sectional view of the gas generator 1 in a height direction. The gas generator 1 is configured to burn a gas generating agent filled in a housing 4 formed by an upper shell 2 and a lower shell 3 thereby ejecting combustion gas. Note that the gas generator 1 is a so-called dual-type gas generator including two combustion chambers disposed on the upper side and lower side, respectively, and each of the two combustion chambers includes correspondingly an igniter and a gas generating agent (one of the two combustion chambers is the ejector 100 as the igniter), as described below. The upper shell 2 includes a peripheral wall 2c and a top surface 2d, which form a recessed internal space. The top surface 2d and a bottom surface 3b of the lower shell 3 have a substantially circular shape in a top view, and the peripheral wall 2c and a peripheral wall 3a of the lower shell 3 surround the top surface 2d and the bottom surface 3b, respectively, and form a wall surface having an annular shape and extending substantially perpendicularly from each surface. The internal space of the upper shell 2 is a first combustion chamber 21 filled with a first transfer charge 24 and a first gas generating agent 22, as described below. The top surface 2d is connected to one end of the peripheral wall 2c, and the other end of the peripheral wall 2c serves as an opening of the upper shell 2. Further, at the other end of the peripheral wall 2c, a mating wall 2a and an abutting section 2b are provided, in this order, from the opening. The radius of the internal space formed by the mating wall 2a is larger than the radius of the internal space formed by the peripheral wall 2c near the top surface 2d, and the mating wall 2a connects to the peripheral wall 2c, with the abutting section 2b being interposed therebetween.

Further, the lower shell 3 includes the peripheral wall 3a and the bottom surface 3b, which form an internal space having a concave shape. This internal space is a second combustion chamber 25 filled with a second gas generating agent 29. The bottom surface 3b is connected to one end of the peripheral wall 3a, and the other end of the peripheral wall 3a serves as an opening of the lower shell 3. The radius of the internal space formed by the peripheral wall 3a is substantially the same as the radius of the internal space formed by the peripheral wall 2c of the upper shell 2. The bottom surface 3b of the lower shell 3 is provided with a hole to which a first igniter 23 is fixed and a hole to which the above-described ejector 100, which is a second igniter, is fixed.

Further, in the housing 4, a divider wall 10 is disposed between the upper shell 2 and the lower shell 3. The divider wall 10 includes a terminating end 15, a dividing wall 14 connected to the terminating end 15 and dividing the internal space of the housing 4 substantially into an upper space and a lower space, a peripheral wall 13 connected to the dividing wall 14 and extending along the accommodating wall member 16 that is described later, and an end 12 disposed to partially cover an opening of the accommodating wall member 16. Note that, a through hole 11 is formed at the end 12. The accommodating wall member 16 having a cylindrical shape is provided on the bottom surface 3b to surround the first igniter 23 in a height direction thereof, with the first igniter 23 being attached at the bottom surface 3b of the lower shell 3. The upper opening of the accommodating wall member 16 is covered by the end 12 of the divider wall 10. The first transfer charge 24 is filled in a predetermined space 20, which is the internal space of the accommodating wall member 16 but not including a space occupied by the first igniter 23. Note that the first transfer charge 24 is filled in an aluminum accommodating container 18 substantially occupying the predetermined space 20. As the first transfer charge 24, a gas generating agent having excellent ignitability and having a combustion temperature higher than that of the first gas generating agent 22 may be used. The combustion temperature of the first transfer charge 24 may be in a range from 1700 to 3000° C. Examples of the first transfer charge 24 include a pellet-shaped or cylindrical transfer charge including, for example, nitroguanidine (34 wt. %) and strontium nitrate (56 wt. %). In the first combustion chamber 21, the through hole 11, which substantially serves as the opening of the predetermined space 20, is closed by an aluminum tape 36, and thus mixing with the first gas generating agent 22, filled in a space above the predetermined space 20 (a space substantially above the dividing wall 14), is prevented.

Further, a through hole 17 is provided in a part of the peripheral wall of the accommodating wall member 16, which is a part on the opposite side of the peripheral wall to the ejector 100. The through hole 17 makes the two spaces (the first combustion chamber 21 and the second combustion chamber 25), which are formed by dividing by the divider wall 10, communicate with each other. Note that the through hole 17 is closed by a wall surface of the accommodating container 18 from the predetermined space 20 side. When such a configuration is employed, a difference in burst pressure occurs on wall surfaces of the accommodating container 18, and thus the accommodating container 18 is cleaved only when the ejector 100 in the second combustion chamber 25 is actuated, as described later.

With the divider wall 10 being attached on the lower shell 3 in the above-described manner, the upper shell 2 is attached from above. As described above, since the radius of the internal space formed by the mating wall 2a of the upper shell 2 is larger than the radius of the internal space formed by the peripheral wall 2c, the upper shell 2 is mated with the lower shell 3 whereby the abutting section 2b abuts on the terminating end 15 of the divider wall 10. Note that, in the housing 4, mating parts and contact parts used for the upper shell 2 and the lower shell 3, are joined together by any suitable joining method (for example, welding) for moisture prevention, etc., of the gas generating agent filled in the housing 4.

As described above, the internal space of the housing 4 is substantially divided, by the divider wall 10, into two spaces positioned on the upper side and the lower side. Of the internal space of the housing 4, in the first combustion chamber 21, which is defined by the upper shell 2 and the divider wall 10, the first igniter 23, the first transfer charge 24, and the first gas generating agent 22 are disposed, and in the second combustion chamber 25, which is defined by the lower shell 3 and the divider wall 10, the ejector 100 and the second gas generating agent 29 are disposed, thus, the gas generator 1 is configured as a dual type gas generator including the first igniter 23 and the ejector 100. Note that the first igniter 23 and the ejector 100 are both fixed at the bottom surface 3b of the lower shell 3, and thus the side of the first igniter 23 is surrounded by the accommodating wall member 16.

In the first combustion chamber 21, the space above the aluminum tape 36, which closes the opening of the predetermined space 20, is filled with the first gas generating agent 22, and an annular filter 32 is disposed surrounding the first gas generating agent 22. Here, the first gas generating agent 22 is filled in a state of being pressed, by biasing force applied by a cushion 31, against the filter 32, the dividing wall 14, etc., and thus the first gas generating agent 22 is not subjected to unnecessary vibration in the first combustion chamber 21. As the first gas generating agent 22, a gas generating agent having a combustion temperature lower than that of the first transfer charge 24 is used. It is preferable that the first gas generating agent 22 has a combustion temperature in a range of 1000 to 1700° C. Moreover, as the first gas generating agent 22, a single hole cylindrical gas generating agent including guanidine nitrate (41 wt. %), basic copper nitrate (49 wt. %), and a binder and/or an additive may be used, for example.

The filter 32 is formed by stacking flat woven meshes made of stainless steel in the radial direction and compressing the meshes in the radial and axial directions. The filter 32 is configured to cool the combustion gas of the first gas generating agent 22 and filter combustion residue included in the combustion gas. Alternatively, a filter having a wire wound type structure, in which a wire is wound on a core rod to form multiple layers, may be used as the filter 32. Note that the filter 32 also filters the combustion residue of the second gas generating agent 29 filled in the second combustion chamber 25. In addition, a gap 33 formed between the peripheral wall 2c of the upper shell 2 and the filter 32 forms a gas passage that surrounds the filter 32 and has an annular shape in cross sectional view in the radial direction. The gap 33 allows the combustion gas to pass through the entire region of the filter 32, making it possible to achieve efficient utilization of the filter 32 and effective cooling and purification of the combustion gas. The combustion gas flowing through the gap 33 reaches a gas discharge port 5 provided in the peripheral wall 2c. In addition, to prevent moisture from entering the housing 4 from outside, in this gas generator 1 before being actuated, the gas discharge port 5 is closed, by an aluminum tape 34, from the inside of the housing 4.

Next, the second combustion chamber 25 is filled with the second gas generating agent 29, corresponding to the ejector 100 fixed to the bottom surface 3b of the lower shell 3. The second combustion chamber 25 is a space defined by the inner wall surface of the peripheral wall 3a of the lower shell 3 and the accommodating wall member 16, which serve as side surfaces, the bottom surface 3b of the lower shell 3, which serves as a bottom surface, and the dividing wall 14 of the divider wall 10, which serves as an upper surface. Further, for the second gas generating agent 29, similarly to the first gas generating agent 22, for example, a monoporous cylindrical material made from guanidine nitrate (41 wt. %), basic copper nitrate (49 wt. %), and a binder or an additive may be used.

In the gas generator 1 thus configured, first, when the first igniter 23 is actuated, the first transfer agent 24 is ignited, and the first gas generating agent 22 is then burned. Then, the combustion gas generated by the first gas generating agent 22 is ejected to the outside from the gas discharge port 5 via the filter 32. Next, when the ejector 100 is actuated, the second gas generating agent 29 is burned.

Here, as illustrated in FIG. 13, the second combustion chamber 25 on the lower shell 3 side is filled with the second gas generating agent 29 on the side of the ejector 100. In this regard, it can be understood that this state is different from the state where the first gas generating agent 22, which is filled in the first combustion chamber 21 on the upper shell 2 side, is positioned above the first igniter 23. As illustrated in the first example above, the ejector 100 suitably ejects combustion gas (combustion gas generated by combustion of the gas generating agent 121) laterally from the ejector 100. That is, other than a flow that is created when part of the combustion gas collides with the divider wall 10 through the through-hole 108 formed on the bottom surface 107 of the cup 104 and that is reflected toward the bottom surface 3b side of the lower shell 3, another flow that is discharged laterally and radially from the peripheral wall 105 of the cup 104 is formed. Thus, in the dual type gas generator 1 as illustrated in FIG. 13, the combustion gas can be effectively supplied to the second gas generating agent 29 filled in the second combustion chamber 25, and therefore, the second gas generating agent 29 can be effectively burned to produce the combustion gas. The combustion gas ejected from the ejector 100 and the combustion gas generated by the combustion of the second gas generating agent 29 are ejected to the outside from the gas discharge port 5 through the through hole 17 by way of the first combustion chamber 21.

Modified Example 1

Figure 14:
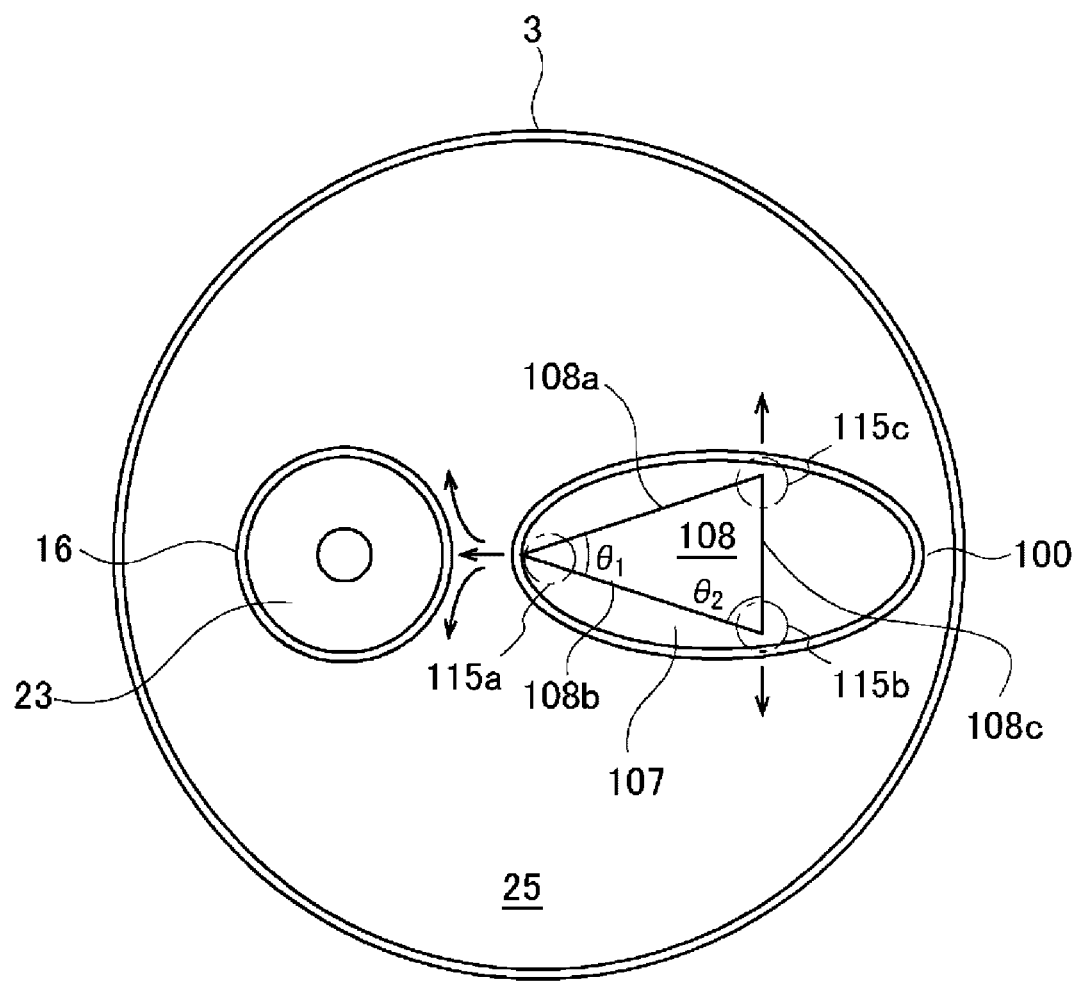
FIG. 14 is a schematic diagram illustrating a configuration of a modified example of the gas generator including the ejector according to the present invention.

A modified example 1 of the gas generator 1 will be described based on FIG. 14. FIG. 14 is a diagram of the inside of the lower shell 3 of the gas generator 1 of the present modified example, seen from above. A difference between the present modified example and the second example is a shape of the through-hole 108 provided in the bottom surface 107 of the cup 104 of the ejector 100. In the present modified example, the through-hole 108 is formed to have an isosceles triangle. Specifically, the through-hole 108 is defined by the through-hole peripheral edges 108a and 108b having the same length and the through-hole peripheral edge 108c having a length shorter than the previous-edges 108a and 108b. As a result, as illustrated in FIG. 14, the cup-like shape of the ejector 100 is oblong.

Further, the narrow part defined by the through-hole peripheral edges 108a and 108b is referred to by 115a, the narrow part defined by the through-hole peripheral edges 108b and 108c is referred to by 115b, and the narrow part defined by the through-hole peripheral edges 108c and 108a is referred to by 115c. At this time, when a reduction amount of the width of the narrow part due to unit-distance displacement from the center of the bottom surface 107 toward the periphery of the bottom surface 107 in the narrow part is defined as a width-reduction rate of the narrow part, the width-reduction rate of the narrow part 115a is smaller than the width-reduction rates of the other narrow parts 115b and 115c. Note that the width-reduction rate of the narrow part 115b is the same as the width-reduction rate of the narrow part 115c.

In the ejector 100 in which the through-hole 108 is thus formed, the narrow part 115a having a smaller width-reduction rate receives greater stress in an early stage of combustion of the gas generating agent 121 than the other narrow parts 115b and 115c, and as a result, cleavage occurs earlier near the narrow part 115a than the other narrow parts 115b and 115c in the nearby bottom surface 107. Therefore, in the second combustion chamber 25, the second gas generating agent 29 disposed near the narrow part 115a can be burned preferentially over the second gas generating agent 29 disposed near the narrow parts 115b and 115c.

Here, with the first igniter 23 being disposed in the second combustion chamber 25, the ejector 100 is positionally shifted from the center of the second combustion chamber (i.e., positionally shifted to the right side in FIG. 14), and in addition, the accommodating wall member 16 is disposed inside the second combustion chamber 25. Here, when a distance, over which the combustion of the second gas generating agent 29 by the combustion product ejected from the ejector 100 propagates, is defined as a combustion distance, the combustion distance from the ejector 100 varies in the second combustion chamber 25, depending on positioning of the ejector 100 and the accommodating wall member 16 in the second combustion chamber 25. For example, when the ejector 100 is at the center in FIG. 14, in a region in the vicinity of the inner wall surface on the right side of the lower shell 3, the combustion distance from the ejector 100 is relatively short, and on the other hand, in regions in the vicinity of the inner wall surface on the left side of the lower shell 3 and at the rear surface side of the accommodating wall member 16, the combustion distance from the ejector 100 is relatively long. When the ejector 100 is at the center, on the basis of the combustion distance, the former is referred to as a proximal region, and the latter is referred to as a distal region.

In consideration of the characteristics of the ejector 100 and the positional arrangement of the ejector 100 and the accommodating wall member 16 in the second combustion chamber 25, in the present modified example, as illustrated in FIG. 14, the ejector 100 is fixed to the lower shell 3 in a state where the narrow part 115a of the ejector 100 is oriented toward the distal region, which is a region on the rear surface side of the accommodating wall member 16, and the other narrow parts 115b and 115c are oriented toward the proximal region, which is region in the vicinity of the inner wall surface on the right side of the lower shell 3. As a result, the combustion gas preferentially ejected in the vicinity of the narrow part 115a collides with the accommodating wall member 16 and bifurcates as illustrated in FIG. 14, and then, quickly reaches the distal region on the rear side of the accommodating wall member 16 and in the vicinity of the inner wall surface on the left side of the lower shell 3. With the ejector 100 being disposed in this way, the second gas generating agent 29 located far from the ejector 100 can be burned suitably, and the combustion of the second gas generating agent 29 in the second combustion chamber 25 can be made uniform. Furthermore, as described in the first example, the through-hole 108 can be relatively easily formed by using a press machine or the like, hence, manufacturing load can be significantly reduced, compared to that required for adjusting the thickness when forming a thinned part in the related art, and at the same time, the combustion of the second gas generating agent 29 can be made uniform, as described above.

REFERENCE SIGNS LIST

1 Gas Generator
2 Upper shell
3 Lower shell
4 Housing
5 Gas discharge port
10 Divider wall
16 Accommodating wall member
21 First combustion chamber
22 First gas generating agent
23 First igniter
24 First transfer charge
25 Second combustion chamber
29 Second gas generating agent
31 Cushion
32 Filter
100 Ejector
101 Igniter
102 Ignition portion
103 Base member
104 Cup
105 Peripheral wall
105a, 105b, 105b1, 105b2 Thinned part
107 Bottom surface
108 Through-hole
108a, 108b, 108c, 108d, 108x Through-hole peripheral edge
109 Perforated member
115, 115a, 115b, 115c, 115d Narrow part
120 Accommodating space
121 Gas generating agent
125a, 125b, 125c, 125d Non-narrow part
Ep Deepest end

What is claimed is:

1. An ejector for ejecting a combustion product, comprising:
an igniter including an ignition charge and an ignition portion configured to burn the ignition charge;
a pyrotechnic agent disposed to be burned by combustion of the ignition charge; and
a cup made of metal, the cup including a bottom surface and a peripheral wall, the bottom surface being disposed opposite the ignition portion, the peripheral wall being contiguous with a peripheral edge of the bottom surface and disposed to surround the ignition portion, the cup further including an accommodating space formed by the peripheral wall and the bottom surface and accommodating therein the pyrotechnic agent,
the bottom surface of the cup including a through-hole through which the accommodating space and an outside of the cup communicate with each other, the through-hole being defined by a plurality of through-hole peripheral edges, and the adjacent ones of the through-hole peripheral edges being connected together at a predetermined connection point, and
the through-hole including a narrow part, in which a width of the through-hole defined by each of parts of the adjacent through-hole peripheral edges of the plurality of through-hole peripheral edges decreases gradually with an increasing distance from a center of the bottom surface toward the peripheral edge of the bottom surface, and the narrow part being located closer to the peripheral edge of the bottom surface than a non-narrow part, which is defined by each of other parts of the adjacent through-hole peripheral edges, is located.

2. The ejector according to claim 1, wherein the narrow part extends up to the peripheral edge of the bottom surface.

3. The ejector according to claim 1, wherein in the accommodating space of the cup, a perforated member is disposed to cover the through-hole, the perforated member including a plurality of holes that are sized not to allow the pyrotechnic agent to pass therethrough.

4. The ejector according to claim 1, wherein
the narrow part is provided in plurality in the through-hole, and the plurality of narrow parts have a same shape, and
in the through-hole, the plurality of narrow parts are arranged at equal intervals along a circumferential direction of the bottom surface, with the center of the bottom surface as a center axis.

5. The ejector according to claim 1, wherein
for the narrow part, a reduction amount of a width of the narrow part due to unit-distance displacement from the center of the bottom surface toward the peripheral edge of the bottom surface is defined as a width-reduction rate of the narrow part, and
the narrow part is formed in plurality in the through-hole, and a width-reduction rate of one of the plurality of narrow parts is different from a width-reduction rate of another narrow part.

6. The ejector according to claim 1, wherein the narrow part includes a deepest end formed as a point located closest to the peripheral edge of the bottom surface.

7. The ejector according to claim 6, wherein at the deepest end, a connection angle formed at the connection point between the adjacent through-hole peripheral edges defining the narrow part is equal to or less than 120 degrees.

8. The ejector according to claim 1, wherein
in the peripheral wall of the cup, a fragile part is formed at a position corresponding to the narrow part, the fragile part extending in a longitudinal direction of the cup and having a strength lower than those of other parts of the peripheral wall, and
the fragile part is configured to allow the peripheral wall to cleave along the fragile part.

9. The ejector according to claim 8, wherein in the peripheral wall of the cup, a stopper configured to stop the cleavage at the fragile part is formed at a position corresponding to the fragile part between an end on an opposite side of the fragile part to the bottom surface, and a peripheral edge on an opposite side of the peripheral wall to the bottom surface.

10. A gas generator, comprising:
the ejector according to claim 1; and
a housing including a gas discharge port for discharging combustion gas generated by combustion of a gas generating agent, the housing being configured to accommodate therein the ejector and the gas generating agent, wherein
the ejector is disposed in the housing in a manner in which the bottom surface faces an inner wall surface of the housing and the gas generating agent is disposed along the peripheral wall.

11. A gas generator, comprising:
the ejector according to claim 1; and
a housing including a gas discharge port for discharging combustion gas generated by combustion of a gas generating agent, the housing being configured to accommodate therein the ejector and the gas generating agent, wherein
for a narrow part, a reduction amount of a width of the narrow part due to unit-distance displacement from a center of the bottom surface toward the peripheral edge of the bottom surface is defined as a width-reduction rate of the narrow part,
the narrow part is formed in plurality in the through-hole, and a width-reduction rate in a narrow part of the plurality of narrow parts is smaller than a width-reduction rate of another narrow part, and
in a state where the ejector is accommodated in the housing with an uneven combustion distance from the ejector with regard to the gas generating agent disposed between the housing and the ejector, the narrow part is oriented, inside the housing, toward a distal region in which the combustion distance from the ejector is longest, and the other narrow part is oriented, inside the housing, toward a proximal region in which the combustion distance from the ejector is shorter than the combustion distance in the distal region.

12. An ejector for ejecting a combustion product, comprising:
an igniter including an ignition charge and an ignition portion configured to burn the ignition charge; and
a cup defining therein an accommodating space therein and including,
a bottom surface,
a peripheral wall being contiguous with a peripheral edge of the bottom surface and disposed to surround the ignition portion, and
a through-hole provided in the bottom surface and through which the accommodating space and an outside of the cup communicate with each other, the through-hole being defined by a plurality of through-hole peripheral edges, and the adjacent through-hole peripheral edges being connected together at a predetermined connection point, the through-hole including a narrow part, in which a width of the through-hole defined by each of the adjacent ones of the through-hole peripheral edges decreases gradually with an increasing distance from a center of the bottom surface toward the peripheral edge of the bottom surface, and the narrow part being located closer to the peripheral edge of the bottom surface than a non-narrow part, which is defined by each of other parts of the adjacent through-hole peripheral edges, is located.

13. The ejector according to claim 12, wherein the narrow part includes a deepest end formed as a point located closest to the peripheral edge of the bottom surface.

14. The ejector according to claim 12, wherein at a deepest end, a connection angle formed at the connection point between the adjacent through-hole peripheral edges is equal to or less than 120 degrees.

15. The ejector according to claim 12, further comprising:
a fragile part formed, in the peripheral wall of the cup, at a position corresponding to the narrow part, the fragile part extending in a longitudinal direction of the cup and having a strength lower than those of other parts of the peripheral wall, the fragile part being configured to allow the peripheral wall to cleave along the fragile part.

16. The ejector according to claim 12, further comprising:
a perforated member disposed in the accommodating space of the cup to cover the through-hole, the perforated member including a plurality of holes that are sized not to allow a pyrotechnic agent to pass therethrough.

17. The ejector according to claim 12, wherein
the narrow part is provided in plurality in the through-hole, and the plurality of narrow parts have a same shape, and
in the through-hole, the plurality of narrow parts are arranged at equal intervals along a circumferential direction of the bottom surface, with a center of the bottom surface as a center axis.

* * * * *